(12) United States Patent
Long

(10) Patent No.: US 11,310,160 B2
(45) Date of Patent: Apr. 19, 2022

(54) BANDWIDTH INFORMATION NOTIFICATION METHOD, NETWORK NODE AND COMMUNICATION SYSTEM

(71) Applicant: Huawei Technologies Co., Ltd., Shenzhen (CN)

(72) Inventor: Hao Long, Madrid (ES)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 15/682,352

(22) Filed: Aug. 21, 2017

(65) Prior Publication Data

US 2017/0346744 A1 Nov. 30, 2017

Related U.S. Application Data

(63) Continuation of application No. 14/816,567, filed on Aug. 3, 2015, now Pat. No. 9,755,975, which is a (Continued)

(30) Foreign Application Priority Data

Aug. 21, 2009 (CN) .......................... 200910167223.6

(51) Int. Cl.
*H04W 28/12* (2009.01)
*H04L 47/20* (2022.01)
(Continued)

(52) U.S. Cl.
CPC ............ *H04L 47/20* (2013.01); *H04L 1/0003* (2013.01); *H04L 47/12* (2013.01); *H04L 47/14* (2013.01);
(Continued)

(58) Field of Classification Search
CPC ....... H04L 47/20; H04L 47/26; H04L 1/0003; H04L 47/14; H04L 47/2408; H04W 28/18
See application file for complete search history.

(56) References Cited

U.S. PATENT DOCUMENTS 6,393,064 B1  5/2002  Nagai et al.
6,865,156 B2  3/2005  Horioka et al.
(Continued)

FOREIGN PATENT DOCUMENTS

CN   1852325 A   10/2006
CN   1925429 A    3/2007
(Continued)

OTHER PUBLICATIONS

Luong, D.-D., et al., "QoS Protection in Cognitive Wireless Mesh Networks," 2009 Fiflli International Conference on Networking and Services, IEEE 2009, 6 pages.
(Continued)

*Primary Examiner* — Mansour Oveissi
(74) *Attorney, Agent, or Firm* — Slater Matsil, LLP

(57) ABSTRACT

A bandwidth information notification method includes: obtaining bandwidth information of a microwave link; and sending a plurality of OAM messages carrying the bandwidth information to an endpoint, wherein first one or more OAM messages of the plurality of OAM messages are sent more quickly than at least one of the rest of the plurality of OAM messages.

12 Claims, 4 Drawing Sheets

Related U.S. Application Data continuation of application No. 13/371,795, filed on Feb. 13, 2012, now Pat. No. 9,100,327, which is a continuation of application No. PCT/CN2010/076043, filed on Aug. 17, 2010.

(51) Int. Cl.

| | |
|---|---|
| *H04L 47/12* | (2022.01) |
| *H04W 28/02* | (2009.01) |
| *H04L 47/26* | (2022.01) |
| *H04W 28/18* | (2009.01) |
| *H04L 1/00* | (2006.01) |
| *H04L 47/2408* | (2022.01) |

(52) U.S. Cl.
CPC .......... *H04L 47/2408* (2013.01); *H04L 47/26* (2013.01); *H04W 28/12* (2013.01); *H04W 28/18* (2013.01)

(56) References Cited

U.S. PATENT DOCUMENTS

| | | | |
|---|---|---|---|
| 6,912,215 B1 | 6/2005 | Lin et al. | |
| 7,969,903 B2 | 6/2011 | Zhang | |
| 9,100,327 B2 | 8/2015 | Long | |
| 2003/0179769 A1* | 9/2003 | Shi | H04J 3/1694 370/442 |
| 2004/0106434 A1 | 6/2004 | Shibasaki | |
| 2004/0165534 A1* | 8/2004 | Claseman | H04L 1/0061 370/241.1 |
| 2004/0202175 A1 | 10/2004 | Horioka et al. | |
| 2006/0045041 A1 | 3/2006 | Yuuki | |
| 2007/0036073 A1 | 2/2007 | Kamada et al. | |
| 2007/0064604 A1 | 3/2007 | Chen et al. | |
| 2007/0064605 A1 | 3/2007 | Ho et al. | |
| 2007/0070910 A1* | 3/2007 | Blum | H04L 41/00 370/241.1 |
| 2008/0186865 A1* | 8/2008 | Yong | H04L 47/76 370/244 |
| 2008/0298299 A1 | 12/2008 | Thesling | |
| 2009/0245408 A1 | 10/2009 | Mujtaba et al. | |
| 2010/0074165 A1* | 3/2010 | Yokota | H04L 47/822 370/315 |
| 2010/0142550 A1 | 6/2010 | Zhang | |
| 2010/0232785 A1 | 9/2010 | Gazier et al. | |
| 2010/0281518 A1 | 11/2010 | Bugenhagen | |
| 2011/0028146 A1* | 2/2011 | Tammisetti | H04L 45/24 455/426.1 |
| 2011/0044238 A1* | 2/2011 | Shi | H04W 48/08 370/328 |
| 2012/0140625 A1 | 6/2012 | Long | |

FOREIGN PATENT DOCUMENTS

| | | |
|---|---|---|
| CN | 101465714 A | 6/2009 |
| CN | 101582839 A | 11/2009 |
| CN | 101631363 A | 1/2010 |
| EP | 1276265 A2 | 1/2003 |
| EP | 2451207 A1 | 5/2012 |
| JP | 2001358729 A | 12/2001 |
| JP | 2004179893 A | 6/2004 |
| JP | 2006067433 A | 3/2006 |
| JP | 2006287549 A | 10/2006 |
| WO | 2008095386 A1 | 8/2008 |

OTHER PUBLICATIONS

Itu-T, Series G: Transmission Systems and Media, Digital Systems and Networks, Ethernet over Transport aspects—General aspects, Series Y: Global Information Infrastructure, Internet Protocol Aspects and Next-Generation Networks, Internet Protocol Aspects—Transport, Ethernet Protection Switching, G.8031/Y.1342, Jun. 2006, 52 pages.

IEEE, "IEEE Standard for Information Technology-Telecommunications and Information Exchange between Systems-Local and Metropolitan Area Networks-Specific Requirements, Part 3: Carrier Sense Multiple Access with Collision Detection (CSMA/CD) Access Method and Physical Layer Specifications, Amendment: Media Access Control, Parameters, Physical Layers, and Management Parameters for Subscriber Access Networks," IEEE Computer Society, Std 802.ah, Sep. 7, 2004, 640 pages.

Itu-T, Series G: Transmission Systems and Media, Digital Systems and Networks, Packet over Transport Aspects-Ethernet over Transport Aspects, Series Y: Global Information INfrastructure, INternet Protocol Aspects and Next-Generation Networks, Internet Protocol Aspects-Transport, Characteristics of Ethernet Transport Network Equipment functional Blocks, Amendment 1, G.8021/Y.1341, Jan. 2009, 89 pages.

Itu-T, "Series Y: Global Information Infrastructure, Internet Protocol Aspects and Next-Generation Networks, Internet Protocol Aspects-Operation, Administration and Maintenance, OAM Functions and Mechanisms for Ethernet Based Neworks," Y.1731, Feb. 2008, 82 pages.

\* cited by examiner

BANDWIDTH INFORMATION NOTIFICATION METHOD, NETWORK NODE AND COMMUNICATION SYSTEM

CROSS-REFERENCE TO RELATED APPLICATIONS

This application is a continuation of U.S. patent application Ser. No. 14/816,567, filed on Aug. 3, 2015, which is a continuation of U.S. patent application Ser. No. 13/371,795, filed on Feb. 13, 2012, now U.S. Pat. No. 9,100,327, which is a continuation of International Application No. PCT/CN2010/076043, filed on Aug. 17, 2010, which claims priority to Chinese Patent Application No. 200910167223.6, filed on Aug. 21, 2009. The afore-mentioned patent applications are hereby incorporated by reference in their entireties.

TECHNICAL FIELD

The present invention relates to the field of communication technologies, and in particular, to a bandwidth information notification method, a network node, and a communication system.

BACKGROUND

Internet Protocol (IP) services increase rapidly, and become a mainstream service type by replacing time division multiplexing (TDM) services gradually. And network traffic also increases rapidly. Traditional Synchronous Digital Hierarchy (SDH)/Multi-Service Transport Platform (MSTP) equipment cannot make full use of a statistic multiplexing feature of a packet service, and cannot meet an increasingly stringent bandwidth requirement in another aspect. Therefore, SDH equipment is being replaced by packet transport network (PTN) equipment.

Meanwhile, microwave equipment is widely applied in the operator' network. Currently, SDH microwave equipment and Plesiochronous Digital Hierarchy (PDH) microwave equipment are commonly deployed. As PTN equipment replaces SDH equipment, packet microwave equipment begins to replace SDH/PDH microwave equipment accordingly, and is widely applied in recent years. The packet microwave equipment refers to that packet equipment having one or more microwave interfaces.

A microwave link differs from a fiber link in that the microwave link can perform adaptive modulation (AM) as the weather changes, which leads to a bandwidth change of the microwave link. Moreover, a bandwidth change is determinate. A transport network generally requires quite high capability of operation, administration and maintenance (OAM). However, PTN OAM functions at present are only some general operations.

The PTN OAM functions at present are only some general operations, and therefore, the microwave link after performing adaptive modulation cannot be notified to an endpoint of a service connection which passes through the microwave link, which causes service congestion since the endpoint of the service connection still performs traffic control according to the bandwidth information before applying adaptive modulation.

SUMMARY

Embodiments of the present invention provide a bandwidth information notification method, a network node, and a communication system, so that a service connection endpoint which passes through a link may obtain current bandwidth information of the link.

An embodiment of the present invention provides a bandwidth information notification method. The method includes obtaining bandwidth information of a microwave link. The method also includes sending a plurality of OAM messages carrying the bandwidth information to an endpoint, wherein when a bandwidth of the microwave link has changed, first one or more OAM messages of the plurality of OAM messages are sent more quickly than at least one of the rest of the plurality of OAM messages.

An embodiment of the present invention provides a bandwidth information processing method. The method includes receiving, by an endpoint, a plurality of operation, administration and maintenance (OAM) messages carrying bandwidth information of a microwave link. The method also includes adjusting, by the endpoint, a service policy according to the bandwidth information.

An embodiment of the present invention further provides a network node. The network node includes a processor, configured to obtain bandwidth information of a microwave link. The network node also includes a transmitter, configured to send a plurality of operation, administration and maintenance (OAM) messages carrying the bandwidth information to an endpoint, wherein when a bandwidth of the microwave link has changed, first one or more OAM messages of the plurality of OAM messages are sent more quickly than at least one of the rest of the plurality of OAM messages.

An embodiment of the present invention further provides a endpoint. The endpoint includes a receiver, configured to receive a plurality of operation, administration and maintenance (OAM) messages carrying bandwidth information of a microwave link. The endpoint also includes a processor, configured to adjust a service policy according to the bandwidth information.

BRIEF DESCRIPTION OF THE DRAWINGS

To describe the technical solutions in the embodiments of the present invention more clearly, the accompanying drawings required for describing the embodiments are introduced briefly in the following. Apparently, the accompanying drawings in the following description are only some embodiments, and persons of ordinary skill in the art may also derive other drawings from these accompanying drawings without making any creative effort.

DETAILED DESCRIPTION OF ILLUSTRATIVE EMBODIMENTS

The technical solutions in the embodiments of the present invention are described clearly in the following with reference to the accompanying drawings in the embodiments of the present invention. Apparently, the embodiments to be described are merely a part rather than all of the embodiments of the present invention. All other embodiments obtained by those skilled in the art without any creative effort shall fall within the protection scope of the present invention.

Figure 1:
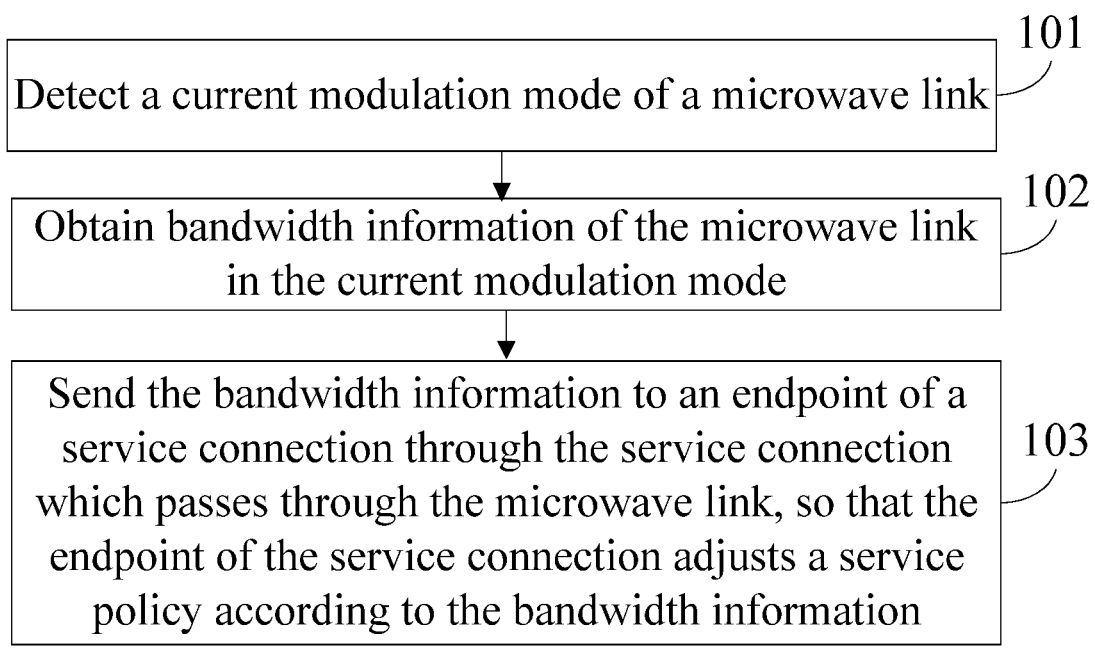
FIG. 1 is a flowchart of a bandwidth information notification method according to a first embodiment of the present invention.

A bandwidth information notification method provided in an embodiment of the present invention is described first. FIG. 1 illustrates a procedure of a bandwidth information notification method according to a first embodiment. In this embodiment, a processing procedure of a network node that is attached by a microwave link is described, which includes the following steps.

101: Detect a current modulation mode of the microwave link.

The detection may be through real-time monitoring or periodical detection.

102: Obtain bandwidth information of the microwave link in the current modulation mode.

A bandwidth of the microwave link is different in different modulation modes, and the bandwidth of the microwave link in each modulation mode is determinate. Therefore, corresponding bandwidth information may be obtained once the current modulation mode of the microwave link is determined. The obtained bandwidth information may be bandwidth level indication information or modulation mode information.

For example, an optimal modulation mode of the microwave link is 64 Quadrature Amplitude Modulation (QAM), and a bandwidth in this modulation mode is 1 Gbps; when a modulation mode is 16QAM, a bandwidth is 0.6 Gbps; therefore, when a modulation mode is 64QAM, bandwidth level indication information may be 1 Gbps; when the modulation mode is 16QAM, the bandwidth level indication information may be 0.6 Gbps; when the modulation mode is 64QAM, modulation mode information may be a 64QAM modulation mode; and when the modulation mode is 16QAM, the modulation mode information may be a 16QAM modulation mode. In an embodiment of the present invention, the bandwidth indication information may also not be a specific bandwidth value, but a number that represents the bandwidth value. For example, 7 represents 1 Gbps, and 5 represents 0.6 Gbps. Therefore, in the case of the 64QAM modulation mode, the bandwidth level indication information may be 7; and in the case of the 16QAM modulation mode, the bandwidth level indication information may be 5. Specifically, which number represents which bandwidth value may be configured as required.

103: Send the bandwidth information to an endpoint of a service connection through the service connection which passes through the microwave link, so that the endpoint of the service connection adjusts a service policy according to the bandwidth information.

The microwave link is one of the multiple links that are passed through by the service connection. That is, at least one link between two network nodes of the service connection is a microwave link. The service connection may be an Ethernet connection, such as a Virtual Local Area Network (VLAN) connection, and a Provider Backbone Bridge—Traffic Engineering Ethernet Switch Path (PBB-TE ESP) connection; and the service connection may also be a non-Ethernet connection, such as a Multi Protocol Label Switch Label Switched Path (MPLS LSP) connection, and may also be a Label Switched Path (LSP) connection.

The bandwidth information is sent by a network node that is attached by the microwave link through a bandwidth notification message. The bandwidth notification message may be an Alarm Indication Signal/Suppression (AIS) message or a new Operation, Administration, and Maintenance (OAM) message.

In an embodiment of the present invention, bandwidth information may be sent to an endpoint of a service connection which passes through a microwave link through an AIS message. An existing AIS message may be extended, so that the MS message can carry the bandwidth information.

In another embodiment of the present invention, bandwidth information may also be sent through a new OAM message. The new OAM message may be a newly defined OAM message, and may also be a message obtained by extending another OAM message.

It can be known from the preceding that, in this embodiment, the network node that is attached by the microwave link may obtain the bandwidth information of the microwave link in the current modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

Figure 2:
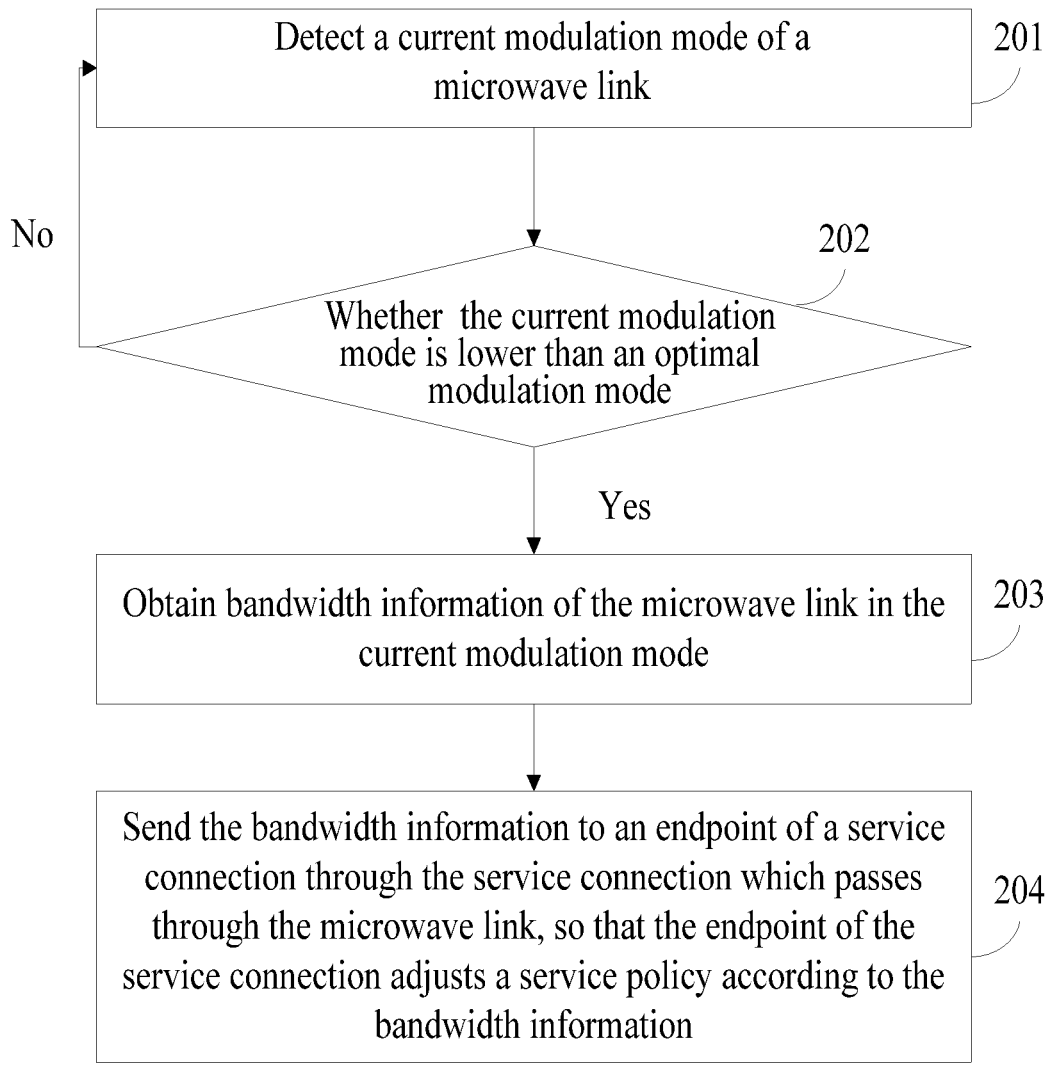
FIG. 2 is a flowchart of a bandwidth information notification method according to a second embodiment of the present invention.

FIG. 2 illustrates a procedure of a bandwidth information notification method according to a second embodiment. In this embodiment, a processing procedure of a network node that is attached by a microwave link is described, which includes the following steps.

201: Detect a current modulation mode of the microwave link.

The detection may be real-time monitoring or periodical detection.

202: Judge whether the current modulation mode is lower than an optimal modulation mode; if the current modulation mode is lower than the optimal modulation mode, proceed to step 203; and if the current modulation mode is not lower than the optimal modulation mode, proceed to step 201.

203: Obtain bandwidth information of the microwave link in the current modulation mode.

Specific execution may be made reference to step 102.

204: Send the bandwidth information to an endpoint of a service connection through the service connection which passes through the microwave link, so that the endpoint of the service connection adjusts a service policy according to the bandwidth information.

Specific execution may be made reference to step 103.

It can be known from the preceding that, in this embodiment, the network node that is attached by the microwave link may obtain the bandwidth information of the microwave link in the current modulation mode when the current modulation mode of the microwave link is lower than the optimal modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

In the bandwidth information notification method provided in the second embodiment of the present invention, the network node that is attached by the microwave link obtains and sends the bandwidth information when the current modulation mode of the microwave link is detected as being lower than the optimal modulation mode; and if it is detected that the current modulation mode of the microwave link is the optimal modulation mode, bandwidth information may be stopped from being sent to the endpoint of the service connection which passes through the microwave link, so that the endpoint of the service connection uses a normal service policy to perform service processing, and ensures that a microwave link resource is fully utilized.

Figure 3:
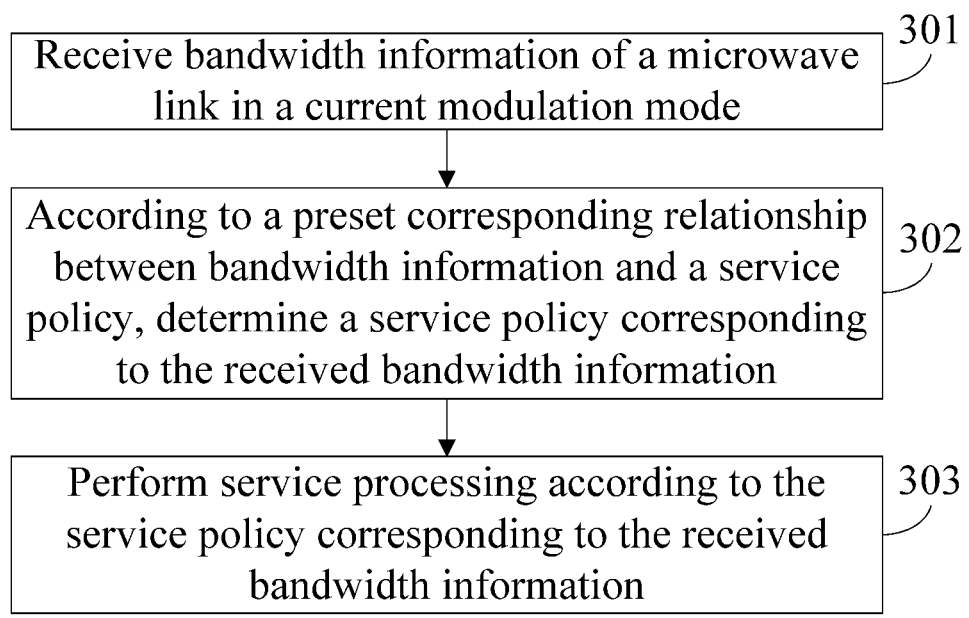
FIG. 3 is a flowchart of a service processing method according to an embodiment of the present invention.

FIG. 3 illustrates a procedure of a service processing method according to an embodiment. In this embodiment, a processing procedure of an endpoint of a service connection which passes through a microwave link is described, which includes the following steps.

301: Receive bandwidth information of the microwave link in a current modulation mode, where the bandwidth information is sent by a network node that is attached by the microwave link.

In an embodiment of the present invention, the received bandwidth information may be sent periodically or non-periodically by the network node that is attached by the microwave link when the network node detects that the current modulation mode is lower than an optimal modulation mode.

302. According to a preset corresponding relationship between bandwidth information and a service policy, determine a service policy corresponding to the received bandwidth information.

The corresponding relationship between the bandwidth information and the service policy may be preset, so that the service policy corresponding to the bandwidth information may be determined after the bandwidth information is received. The service policy may specifically be a quality of service (QoS) policy, or an access control policy, or a service switching policy.

For example, in an embodiment of the present invention, a corresponding relationship may be preset between bandwidth information and a QoS policy, and therefore, after the bandwidth information is received, the QoS policy corresponding to the received bandwidth information may be determined, so that service processing is performed according to the determined QoS policy. Specifically, the endpoint of the service connection may preset a corresponding relationship between bandwidth information and a waterline of a service buffer area. For example, when a bandwidth of the microwave link is larger, a larger service buffer area may be set; and when a bandwidth of the microwave link is smaller, a smaller service buffer area may be set. Therefore, after receiving the bandwidth information, the endpoint of the service connection adjusts the waterline to a position corresponding to a bandwidth that is indicated by the bandwidth information. In this way, a size of the service buffer area is adjusted, and the QoS policy is adjusted.

In another embodiment of the present invention, a corresponding relationship may be preset between bandwidth information and a service switching policy, and therefore, after the bandwidth information is received, the service switching policy corresponding to the received bandwidth information may be determined, so that a service is switched over to a protection path according to the determined service switching policy. The service may be partly or fully switched over to the protection path according to different service switching policies.

If multiple different bandwidth information are received, where the multiple different bandwidth information are corresponding to multiple different bandwidths, bandwidth information corresponding to the smallest bandwidth is selected.

303: Perform service processing according to the service policy corresponding to the received bandwidth information.

Specifically, the service processing may be performed according to the QoS policy corresponding to the bandwidth information, or the access control policy corresponding to the bandwidth information, or the service switching policy corresponding to the bandwidth information.

It can be known from the preceding that, in this embodiment, the endpoint of the service connection which passes through the microwave link receives the bandwidth information of the microwave link in the current modulation mode, where the bandwidth information is sent by the network node that is attached by the microwave link. The service policy is adjusted according to the bandwidth information, so that a bandwidth of the microwave link can meet a service requirement, and service congestion can be avoided.

In another embodiment of the present invention, the network node that is attached by the microwave link obtains and sends the bandwidth information only when the current modulation mode of the microwave link is detected as being lower than the optimal modulation mode; and if the endpoint of the service connection which passes through the microwave link receives no bandwidth information within preset time, it may be considered that the current modulation mode of the microwave link is the optimal modulation mode, so that the service processing is performed by using a normal service policy, thus ensuring that a microwave link resource is fully utilized. The normal service policy may be a normal QoS policy, or a normal access control policy, or a normal service switching policy. When the service policy is a normal service switching policy, the service is switched over from a protection path back to a working path.

With specific examples, a bandwidth information notification method in a third embodiment of the present invention is described as follows.

Figure 4:
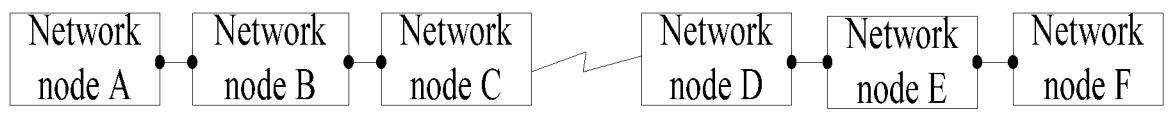
FIG. 4 is a topology diagram of an end-to-end connection in a bandwidth information notification method according to a third embodiment and a fourth embodiment of the present invention.

FIG. 4 illustrates a topology of an end-to-end service connection in a bandwidth information notification method according to the third embodiment. As shown in FIG. 4, the service connection passes through a network node A, a network node B, a network node C, a network node D, a network node E, and a network node F. A link between the network node C and the network node D is a microwave link, and the network node A and the network node F are endpoints of the service connection. In some embodiments, the link between the network node C and the network node D is a microwave link, but a principle of the present invention may be applicable to any type of communication links, for example, a satellite link with a variable bandwidth, a passive optical network link, and a digital subscriber line link.

It is assumed that, in a normal situation, the microwave link between the network node C and the network node D adopts a 64QAM modulation mode, and a corresponding bandwidth is 1 Gbps; when the environment changes, for example, when it rains, the modulation mode is lowered to a 16QAM modulation mode, and the bandwidth decreases to 0.6 Gbps.

When detecting that a current modulation mode is lower than an optimal modulation mode 64QAM, the network node C and the network node D send an AIS message through a service connection (may specifically be an LSP), where the AIS message is extended to carry bandwidth information of the microwave link in the current modulation mode. Specifically, the network node C may send the AIS message to the endpoint A or the endpoint F, and definitely, the network node C may also send the AIS message to both the endpoint A and the endpoint F; and the network node D sends the AIS message to the endpoint A or the endpoint F, and definitely, the network node D may also send the AIS message to both the endpoint A and the endpoint F.

Specifically, the AIS message may be extended to carry a link bandwidth type-length-value (link bandwidth TLV) object, and the link bandwidth TLV object carries the bandwidth information of the microwave link in the current modulation mode. Specifically, the bandwidth information may be bandwidth level indication information or modulation mode information.

In this embodiment, the network node that is attached by the microwave link may carry the bandwidth information through the MS message, and may also carry the bandwidth information through another specific type of message, such as a new OAM message. The AIS message and another specific type of message are uniformly understood as bandwidth notification messages. After receiving the bandwidth information of the microwave link in the current modulation mode, the network node A and the network node F may adjust a service policy according to the bandwidth information.

A specific implementation mode may be: A corresponding relationship is preset between bandwidth information and a QoS policy on the network node A and the network node F. When receiving the bandwidth information of the microwave link in the current modulation mode, the network node A and the network node F enable a QoS policy corresponding to the bandwidth information, and therefore, services are controlled at ingresses (the endpoint A and the endpoint F), so that when the service passes through the microwave link, a congestion situation is avoided.

Another specific implementation mode may be: a corresponding relationship is preset between bandwidth information and a service switching policy on the network node A and the network node F. When receiving the bandwidth information of the microwave link in the current modulation mode, the network node A and the network node F enable a service switching policy corresponding to the bandwidth information, so that a service is partly or fully switched over to a protection path.

When the environment becomes better, and the microwave link is recovered to the optimal modulation mode, the network node C and the network node D stop sending the AIS message.

When no MS message that carries the bandwidth information is received in preset time, the endpoint A and the endpoint F may use a normal service policy to perform service processing.

It can be known from the preceding that, in this embodiment, the network node that is attached by the microwave link may obtain the bandwidth information of the microwave link in the current modulation mode when the current modulation mode of the microwave link is lower than the optimal modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

A bandwidth information notification method provided in a fourth embodiment of the present invention is described by still taking the scenario described in FIG. 4 as an example. As shown in FIG. 4, an end-to-end service connection passes through a network node A, a network node B, a network node C, a network node D, a network node E, and a network node F. A link between the network node C and the network node D is a microwave link, and the network node A and the network node F are endpoints of the service connection.

It is assumed that, in a normal situation, the microwave link between the network node C and the network node D adopts a 64QAM modulation mode, and a corresponding bandwidth is 1 Gbps; when the environment changes, for example, when it rains, the modulation mode is lowered to a 16QAM modulation mode, and the bandwidth decreases to 0.6 Gbps.

The network node C and the network node D detect a current modulation mode in real time, and send a new OAM message periodically through a service connection (may specifically be an LSP) in a normal period. The new OAM message carries bandwidth information of the microwave link in the current modulation mode. Specifically, the network node C may send a new OAM message to the endpoint A or the endpoint F, and definitely, the network node C may also send the new OAM message to both the endpoint A and the endpoint F; and the network node D sends a new OAM message to the endpoint A or the endpoint F, and definitely, the network node D may also send the new OAM message to both the endpoint A and the endpoint F. When it is detected that the modulation mode changes, several OAM messages are sent with a higher frequency, so as to notify the change of the bandwidth in time. Subsequently, the OAM messages are sent in a normal period. For example, a normal period of sending a new OAM message is 1 second; and when the bandwidth changes, the first three frames of the new OAM message are sent in a period of 10 milliseconds, and subsequently, a period of sending a new OAM message is restored to 1 second.

Specifically, the new OAM message and the AIS message are uniformly understood as bandwidth notification messages. The new OAM message may carry a link bandwidth TLV object, and the link bandwidth TLV object carries bandwidth information. Specifically, the bandwidth information may be bandwidth level indication information or modulation mode information.

A specific implementation mode may be: a corresponding relationship is preset between bandwidth information and a QoS policy on the network node A and the network node F. When receiving the bandwidth information of the microwave link in the current modulation mode, the network node A and the network node F enable a QoS policy corresponding to the bandwidth information, and therefore, services are controlled at ingresses (the endpoint A and the endpoint F), so that when the service passes through the microwave link, a congestion situation is avoided.

Another specific implementation mode may be: a corresponding relationship is preset between bandwidth information and a service switching policy on the network node A and the network node F. When receiving the bandwidth information of the microwave link in the current modulation mode, the network node A and the network node F enable a service switching policy corresponding to the bandwidth information, so that a service is partly or fully switched over to a protection path.

It can be known from the preceding that, in this embodiment, the network node that is attached by the microwave link may obtain the bandwidth information of the microwave link in the current modulation mode when the current modulation mode of the microwave link is lower than the optimal modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

Figure 5:
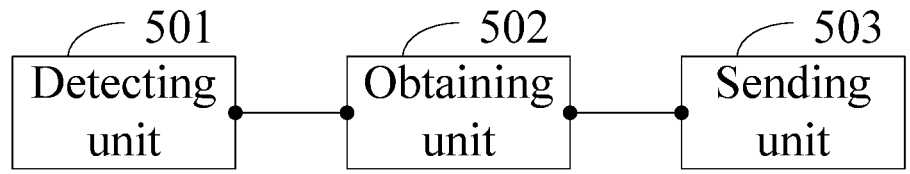
FIG. 5 is a structural diagram of a network node according to a first embodiment of the present invention.

The following describes a network node provided in an embodiment of the present invention. FIG. 5 illustrates a structure of a network node according to a first embodiment. The network node includes: a detecting unit 501, configured to detect a current modulation mode of a microwave link; an obtaining unit 502, configured to obtain bandwidth information of the microwave link in the current modulation mode that is detected by the detecting unit sol; and a sending unit 503, configured to send the bandwidth information obtained by the obtaining unit 502 to an endpoint of a service connection through the service connection which passes through the microwave link, so that the endpoint of the service connection adjusts a service policy according to the bandwidth information.

It can be known from the preceding that, in this embodiment, the network node may obtain the bandwidth information of the microwave link in the current modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

Figure 6:
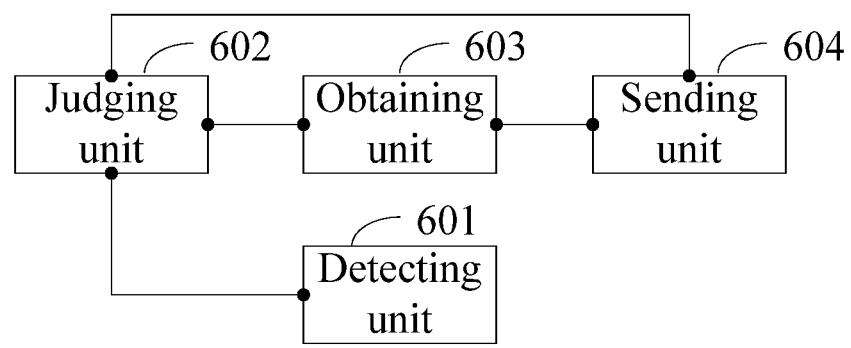
FIG. 6 is a structural diagram of a network node according to a second embodiment of the present invention.

FIG. 6 illustrates a structure of a network node according to a second embodiment. The network node includes: a detecting unit 601, configured to detect a current modulation mode of a microwave link; a judging unit 602, configured to judge whether the current modulation mode that is detected by the detecting unit 601 is lower than an optimal modulation mode; an obtaining unit 603, configured to, when the judging unit 602 judges that the current modulation mode that is detected by the detecting unit is lower than the optimal modulation mode, obtain bandwidth information of the microwave link in the current modulation mode that is detected by the detecting unit; and a sending unit 604, configured to send the bandwidth information obtained by the obtaining unit 603 to an endpoint of a service connection through the service connection which passes through the microwave link, so that the endpoint of the service connection adjusts a service policy according to the bandwidth information.

In an embodiment of the present invention, when the judging unit 602 judges that the current modulation mode is the optimal modulation mode, the sending unit 604 stops sending the bandwidth information to the endpoint of the service connection which passes through the microwave link, so that the endpoint of the service connection uses a normal service policy to perform service processing.

It can be known from the preceding that, in this embodiment, the network node may obtain the bandwidth information of the microwave link in the current modulation mode when the current modulation mode of the microwave link is lower than the optimal modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

Figure 7:
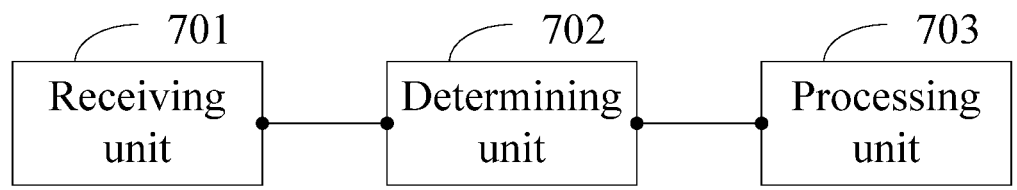
FIG. 7 is a structural diagram of a network node according to a third embodiment of the present invention.

FIG. 7 illustrates a structure of a network node according to a third embodiment. The network node may include: a receiving unit 701 configured to receive bandwidth information of a microwave link in a current modulation mode, where the bandwidth information is sent by a network node that is attached by the microwave link, and a determining unit 702 configured to, according to a preset corresponding relationship between bandwidth information and a service policy, determine a service policy corresponding to the bandwidth information that is received by the receiving unit 701.

In an embodiment of the present invention, the determining unit 702 is further configured to determine the service policy as a normal service policy when the receiving unit 701 does not receive the bandwidth information in preset time.

A processing unit 703 is configured to perform service processing according to the service policy that is determined by the determining unit 702.

It can be known from the preceding that, in this embodiment, the network node may receive the bandwidth information of the microwave link in the current modulation mode, where the bandwidth information is sent by the network node that is attached by the microwave link, and the service policy is adjusted according to the bandwidth information, so that a bandwidth of the microwave link can meet a service requirement, and service congestion can be avoided.

An embodiment of the present invention further provides a communication system. The communication system includes a network node provided in an embodiment of the present invention.

An information exchange between each module in the preceding apparatus and system and an implementation process in the apparatus and system are based on the same conception with the method embodiment of the present invention, and therefore, the specific content may be made reference to the description of the method embodiment of the present invention, which is not further described here.

Persons of ordinary skill in the art may understand that all or part of the procedures of the method in the preceding embodiments may be implemented by a program instructing relevant hardware including a processor. The program may be stored in a computer readable storage medium. When the program runs, the procedures of the method in the preceding embodiments. The storage medium may be a magnetic disk, a read-only memory (ROM), or a random access memory (RAM).

The bandwidth information notification method, the network node, and the communication system that are provided in the embodiments of the present invention are described in detail in the preceding. The description of the preceding embodiments is only used for helping to understand the method and idea of the present invention; meanwhile, those skilled in the art may make variations to the specific implementation and the application scope according to the idea of the present invention. In conclusion, the content of this specification shall not be construed as a limitation to the present invention.

What is claimed is:

1. A method, comprising:
   obtaining, by a network node, a current bandwidth of a microwave link in a current modulation mode, wherein the current bandwidth of the microwave link varies with weather over time;

in response to the current bandwidth of the microwave link in the current modulation mode being lower than a target bandwidth in a target modulation mode, periodically sending, by the network node, a plurality of operation, administration and maintenance (OAM) messages carrying the current bandwidth of the microwave link to an endpoint; and stopping sending, by the network node, OAM messages to the endpoint in response to the current bandwidth of the microwave link in the current modulation mode changing to be the target bandwidth in the target modulation mode.

2. The method according to claim 1, wherein obtaining the current bandwidth of the microwave link in the current modulation mode comprises:

detecting, by the network node, the current modulation mode of the microwave link; and obtaining, by the network node, the current bandwidth of the microwave link in the current modulation mode.

3. The method according to claim 1, wherein periodically sending the plurality of OAM messages comprises:

in response to the current bandwidth of the microwave link in the current modulation mode being lower than a target bandwidth in a target modulation mode, periodically sending, by the network node, a first plurality of OAM messages carrying the current bandwidth of the microwave link in the current modulation mode to the endpoint; and after sending the first plurality of OAM messages carrying the current bandwidth of the microwave link to the endpoint, sending a second plurality of OAM messages carrying the current bandwidth of the microwave link to the endpoint; and wherein OAM messages of the second plurality of OAM messages are periodically sent one at a time using a first period, and OAM messages of the first plurality of OAM messages are periodically sent one at a time using a second period that is smaller than the first period.

4. A network node, comprising:

a processor, configured to obtain a current bandwidth of a microwave link in a current modulation mode, wherein the current bandwidth of the microwave link varies with weather over time; and a transmitter, configured to:

in response to the current bandwidth of the microwave link in the current modulation mode being lower than a target bandwidth in a target modulation mode, periodically send a plurality of operation, administration and maintenance (OAM) messages carrying the current bandwidth of the microwave link to an endpoint; and wherein the transmitter is further configured to stop sending, by the network node, OAM messages to the endpoint in response to the current bandwidth of the microwave link in the current modulation mode changing to be the target bandwidth in the target modulation mode.

5. The network node according to claim 4, wherein the processor is configured to:

detect the current modulation mode of the microwave link; and obtain the current bandwidth of the microwave link in the current modulation mode.

6. The network node according to claim 4, wherein the transmitter is configured to:

in response to the current bandwidth of the microwave link in the current modulation mode being lower than a target bandwidth in a target modulation mode, periodically send a first plurality of OAM messages carrying the current bandwidth of the microwave link to the endpoint; and after sending the first plurality of OAM messages carrying the current bandwidth of the microwave link to the endpoint, send a second plurality of OAM messages carrying the current bandwidth of the microwave link to the endpoint; and wherein OAM messages of the second plurality of OAM messages are periodically sent one at a time using a first period, and OAM messages of the first plurality of OAM messages are periodically sent one at a time using a second period that is smaller than the first period.

7. A method, comprising:

obtaining, by a network node, a current bandwidth of a microwave link in a current modulation mode, wherein the current bandwidth of the microwave link varies with weather over time; and in response to the current bandwidth of the microwave link in the current modulation mode being lower than a target bandwidth in a target modulation mode, periodically sending, by the network node, a plurality of operation, administration and maintenance (OAM) messages carrying the current bandwidth of the microwave link to an endpoint of a service connection;

stopping sending, by the network node, OAM messages to the endpoint in response to the current bandwidth of the microwave link in the current modulation mode changing to be the target bandwidth in the target modulation mode;

receiving, by the endpoint of the service connection, the plurality of OAM messages; and adjusting, by the endpoint of the service connection, a service policy for the service connection according to the current bandwidth of the microwave link carried in the plurality of OAM messages.

8. The method according to claim 7, wherein obtaining the current bandwidth of the microwave link in the current modulation mode comprises:

detecting, by the network node, the current modulation mode of the microwave link; and obtaining monitoring, by the network node, the current bandwidth of the microwave link in the current modulation mode.

9. The method according to claim 7, wherein periodically sending the plurality of OAM messages comprises:

in response to the current bandwidth of the microwave link in the current modulation mode being lower than a target bandwidth in a target modulation mode, periodically sending, by the network node, a first plurality of OAM messages carrying the current bandwidth of the microwave link to the endpoint; and after sending the first plurality of OAM messages carrying the current bandwidth of the microwave link to the endpoint, sending a second plurality of OAM messages carrying the current bandwidth of the microwave link to the endpoint; and wherein OAM messages of the second plurality of OAM messages are periodically sent one at a time using a first period, and OAM messages of the first plurality of OAM messages are periodically sent one at a time using a second period that is smaller than the first period.

10. A communication system, comprising:
a first processor, configured to obtain a current bandwidth of a microwave link in a current modulation mode, wherein the current bandwidth of the microwave link varies with weather over time; and
a transmitter, configured to:
in response to the current bandwidth of the microwave link in the current modulation mode being lower than a target bandwidth in a target modulation mode, periodically send a plurality of operation, administration and maintenance (OAM) messages carrying the current bandwidth of the microwave link to an endpoint;
stop sending OAM messages to the endpoint in response to the current bandwidth of the microwave link in the current modulation mode changing to be the target bandwidth in the target modulation mode;
a receiver, configured to receive the plurality of OAM messages carrying the current bandwidth of the microwave link; and
a second processor, configured to adjust a service policy according to the current bandwidth of the microwave link.

11. The communication system according to claim 10, wherein the first processor is configured to:
detect the current modulation mode of the microwave link; and
obtain the current bandwidth of the microwave link in the current modulation mode.

12. The communication system according to claim 10, wherein the transmitter is configured to:
in response to the current bandwidth of the microwave link in the current modulation mode being lower than a target bandwidth in a target modulation mode, periodically send a first plurality of OAM messages carrying the current bandwidth of the microwave link to the endpoint; and
after sending the first plurality of OAM messages carrying the current bandwidth of the microwave link to the endpoint, send a second plurality of OAM messages carrying the current bandwidth of the microwave link to the endpoint; and
wherein OAM messages of the second plurality of OAM messages are periodically sent one at a time using a first period, and OAM messages of the first plurality of OAM messages are periodically sent one at a time using a second period that is smaller than the first period.

* * * * *